United States Patent
Kida et al.

(10) Patent No.: US 10,373,069 B2
(45) Date of Patent: Aug. 6, 2019

(54) TECHNOLOGIES FOR PLATFORM-TARGETED MACHINE LEARNING

(71) Applicant: Intel Corporation, Santa Clara, CA (US)

(72) Inventors: Luis S. Kida, Beaverton, OR (US);
Nilesh K. Jain, Beaverton, OR (US);
Darshan Iyer, Portland, OR (US);
Ebrahim Al Safadi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 758 days.

(21) Appl. No.: 14/866,895

(22) Filed: Sep. 26, 2015

(65) Prior Publication Data

US 2017/0091657 A1 Mar. 30, 2017

(51) Int. Cl.
*G06N 20/00* (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS

| 7,007,264 B1 | 2/2006 | Baxter |
| 7,818,797 B1 | 10/2010 | Fan |
| 2007/0118487 A1 | 5/2007 | Grichnik |
| 2012/0278263 A1 | 11/2012 | Borthwick |
| 2012/0290131 A1 | 11/2012 | Khouki |
| 2015/0379427 A1* | 12/2015 | Dirac ............... G06N 99/005 706/12 |
| 2015/0379429 A1* | 12/2015 | Lee ................. G06N 99/005 706/11 |
| 2015/0379430 A1* | 12/2015 | Dirac ............... G06N 99/005 706/12 |

OTHER PUBLICATIONS

International Search Report for PCT/US16/048945, dated Dec. 2, 2016 (3 pages).
Written Opinion for PCT/US16/048945, dated Dec. 2, 2016 (6 pages).

* cited by examiner

*Primary Examiner* — Alan Chen
(74) *Attorney, Agent, or Firm* — Barnes & Thornburg LLP

(57) ABSTRACT

Technologies for platform-targeted machine learning include a computing device to generate a machine learning algorithm model indicative of a plurality of classes between which a user input is to be classified and translate the machine learning algorithm model into hardware code for execution on the target platform. The user input is to be classified as being associated with a particular class based on an application of one or more features to the user input, and each of the one or more features has an associated implementation cost indicative of a cost to perform on a target platform on which the corresponding feature is to be applied to the user input.

25 Claims, 8 Drawing Sheets

TECHNOLOGIES FOR PLATFORM-TARGETED MACHINE LEARNING

BACKGROUND

Machine learning involves the construction and use of algorithms to perform pattern recognition and other functions to, for example, form and make predictions on a set of data. In particular, machine learning may be used to find the parameters of a program that optimize the classification of an unknown input into a set of desired classes.

Embedded programs typically have two phases of development. In particular, a classification algorithm that meets a set of accuracy requirements is developed, and then the classification algorithm is attempted to be mapped to a specific computing platform intended to execute the algorithm (e.g., rewriting the algorithms as embedded code within the resource constraints of the computing platform). If the algorithm does not appropriately "fit" the resources of the computing platform, the developer may iteratively modify the algorithm and attempt to map it until the algorithm can run within the resources of the hardware.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
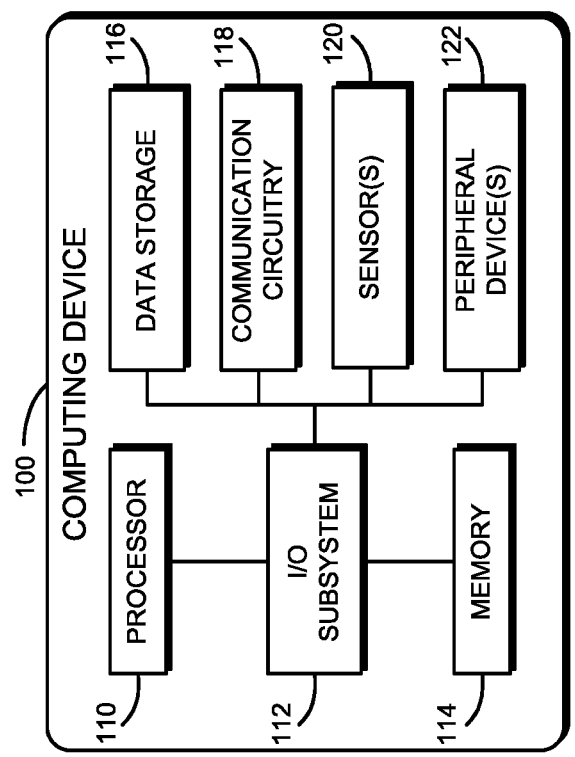
FIG. 1 is a simplified block diagram of at least one embodiment of a computing device for platform-targeted machine learning.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a computing device 100 for platform-targeted machine learning is shown. As described in detail below, the computing device 100 is configured to generate a machine learning algorithm model for classification of input data that balances accuracy of the classification and an estimate of resource utilization on a target platform to implement the model. In doing so, in the illustrative embodiment, the computing device 100 may map the model to hardware code for execution on the target platform through a translation (e.g., instead of complex and time-consuming iterative mapping by a developer). In some embodiments, the computing device 100 may determine and/or analyze a cost matrix for one or more prospective target platforms for a set of features (e.g., indicative of an accuracy of the feature and/or an implementation cost of the feature) and/or refine a set of features by eliminating more costly but highly correlated features (e.g., via unsupervised and/or supervised feature selection). Further, in some embodiments, the computing device 100 may determine the particular clusters to be used for classification (e.g., from training data) by balancing the accuracy of the classification and a hardware or implementation cost (e.g., the hardware resource cost of utilizing an additional cluster).

The computing device 100 may be embodied as any type of computing device or system capable of performing the functions described herein. For example, in some embodiments, the computing device 100 may be embodied as a desktop computer, laptop computer, tablet computer, notebook, netbook, Ultrabook™, smartphone, cellular phone, wearable computing device, personal digital assistant, mobile Internet device, smart device, server, router, switch, Hybrid device, and/or any other computing/communication device. As shown in FIG. 1, the illustrative computing device 100 includes a processor 110, an input/output ("I/O") subsystem 112, a memory 114, a data storage 116, a communication circuitry 118, one or more sensors 120, and one or more peripheral devices 122. Of course, the computing device 100 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 100 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing device 100. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 100, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing device 100 as described herein.

The communication circuitry 118 may be embodied as any communication circuit, device, or collection thereof, capable of enabling communications between the computing device 100 and other remote devices over a network. For example, in some embodiments, the computing device 100 may receive user input data, training data, and/or other useful data for performing the functions described herein from a remote computing device. The communication circuitry 118 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The sensors 120 may be embodied as any one or more sensors configured to generate data/signals indicative of an environment or context of the computing device 100. In various embodiments, the sensors 120 may be embodied as, or otherwise include, for example, inertial sensors, position sensors, location sensors, proximity sensors, optical sensors, light sensors, audio sensors, temperature sensors, motion sensors, piezoelectric sensors, cameras, and/or other types of sensors. Of course, the computing device 100 may also include components and/or devices configured to facilitate the use of the sensor(s) 120. Depending on the particular embodiment, the sensors 120 may include hardware sensors and/or software sensors (e.g., software sensors to identify software applications executed at a particular point in time).

The peripheral devices 122 may include any number of additional peripheral or interface devices, such as speakers, microphones, additional storage devices, and so forth. The particular devices included in the peripheral devices 122 may depend on, for example, the type and/or intended use of the computing device 100.

Figure 2:
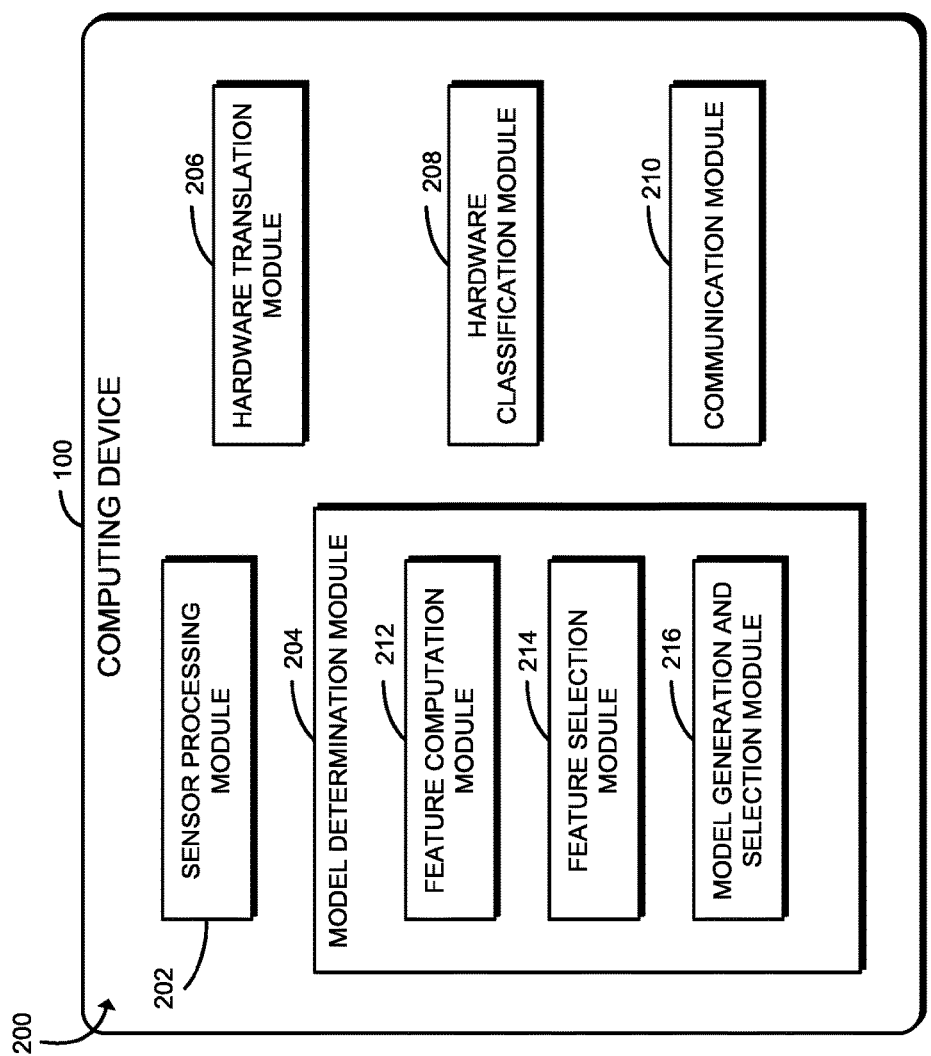
FIG. 2 is a simplified block diagram of at least one embodiment of an environment of the computing device of FIG. 1.

Referring now to FIG. 2, in use, the computing device 100 established an environment 200 for platform-targeted machine learning. The illustrative environment 200 includes a sensor processing module 202, a model determination module 204, a hardware translation module 206, a hardware classification module 208, and a communication module 210. Additionally, in the illustrative embodiments, the model determination module 204 includes a feature computation module 212, a feature selection module 214, and a model generation and selection module 216. The various modules of the environment 200 may be embodied as hardware, software, firmware, or a combination thereof. For example, the various modules, logic, and other components of the environment 200 may form a portion of, or otherwise be established by, the processor 110 or other hardware components of the computing device 100. As such, in some embodiments, one or more of the modules of the environment 200 may be embodied as circuitry or collection of electrical devices (e.g., a sensor processing circuitry 202, a model determination circuitry 204, a hardware translation circuitry 206, a hardware classification circuitry 208, a communication circuitry 210, a feature computation circuitry 212, a feature selection circuitry 214, and a model generation and selection circuitry 216). It should be appreciated that, in such embodiments, one or more of the sensor processing circuitry 202, the model determination circuitry 204, the hardware translation circuitry 206, the hardware classification circuitry 208, the communication circuitry 210, the feature computation circuitry 212, the feature selection circuitry 214, and/or the model generation and selection circuitry 216 may form a portion of one or more of the processor 110, the I/O subsystem 112, the memory 114, the data storage 116, the communication circuitry 118, the sensors 120, and/or the peripheral devices 122. Additionally, in some embodiments, one or more of the illustrative modules may form a portion of another module and/or one or more of the illustrative modules may be independent of one another.

The sensor processing module 202 interprets, analyzes, and/or otherwise processes the data collected/generated by the sensors 120. For example, in some embodiments, the sensor processing module 202 may pre-process raw data generated by the sensors 120 to generate sensor data in a format usable by the computing device 100 (e.g., for a particular purpose).

The model determination module 204 (e.g., a cost-and-quality-informed model determination model) is configured to generate a machine learning algorithm model that balances accuracy of classification with the implementation cost associated with executing corresponding hardware code (e.g., embedded code) on a particular device (i.e., the target platform) or component. It should be appreciated that the feature(s) defined in the model are configured to be applied to a user input to be classified (e.g., from sensor data) in order to identify the class (i.e., defined in the model) of the particular user input. As described below, the model determination module 204 may eliminate features that are highly correlated with other features used for classification and/or select a model size in favor of a reduction in hardware/resource cost. It should be further appreciated that, in the illustrative embodiment, the co-optimization of accuracy and computational resource utilization in the target platform enables automation (instead of manual developer-based iterations) of the target architecture as the compiled code is effectively ensured to "fit" on the platform and operate within the particular resource constraints of that platform.

As indicated above, the model determination module 204 includes the feature computation module 212, the feature selection module 214, and the model generation and selection module 216. The feature computation module 212 is configured to determine/compute and store a cost metric and/or cost matrix for each candidate feature (e.g., a feature transform) of a feature list for one or more given target platforms. It should be appreciated that the features utilized by the feature computation module 212 may vary and may be predefined or user-defined depending on the particular embodiment. For example, in an embodiment, the features may include calculation of the average of user inputs (e.g., sensor data), application of a Fast Fourier Transform (FFT) to a set of input data, and/or another suitable function of the input data. Further, in some embodiments, the features may be applied in parallel to process multiple data streams. As described herein, in the illustrative embodiment, the cost metrics utilized by the feature computation module 212 incorporate an implementation cost of the corresponding feature on a particular target platform. In some embodiments, the feature computation module 212 may compute the cost metrics (e.g., in the background) using simulation, cross-compilation, and/or heuristic-based analysis. It should be appreciated that the cost metrics may allow the computing device 100 to automatically prune features that do not meet the target platform resource budget (e.g., maximum time to compute, buffer size, code size, code instructions, etc.) rather than making such determinations in an ad hoc, manual, and/or iterative manner. Accordingly, the developer may rely on more than mere intuition in balancing the implementation cost with classification accuracy.

The feature selection module 214 is configured to eliminate highly correlated features of a candidate feature set (e.g., the feature list) to generate a reduced feature set based on the cost metrics of the features in the candidate feature set for the particular target platform architecture and/or an implementation budget that indicates, for example, a maximum/available utilization of one or more resources, a maximum number of features included, and/or other suitable constraints. For example, the implementation budget may identify a maximum overall cost to extract the selected features. In some embodiments, the implementation budget may identify a maximum permissible time to compute the feature (e.g., in clock cycles), a maximum buffer size used during application of the feature, a maximum code size associated with the feature extraction, a maximum number of instructions associated with application of the feature, permissible data formats, and/or other suitable cost constraints. In the illustrative embodiment, the feature selection module 214 employs one or more feature selection algorithms (e.g., supervised or unsupervised feature selection) that take into consideration the cost metrics and/or implementation budget of the target platform. For example, the feature selection module 214 may utilize an unsupervised feature selection algorithm to identify features that are highly correlated with one another (e.g., convey the same or similar information) and eliminate one or more redundant features based on the implementation cost of the features (e.g., eliminating the more costly feature(s)). More specifically, in an embodiment, the candidate feature set may include ten features, two of which are highly correlated with one another. Instead of randomly eliminating one of those two features, for example, the feature selection module 214 may eliminate the feature having the more costly implementation (e.g., via a cost function embedded in the framework).

The model generation and selection module 216 is configured to determine the particular classes/clusters involved in classification (e.g., from training data) by balancing the accuracy of the classes and a hardware or implementation cost (e.g., the hardware resource cost of utilizing an additional class for classification). It should be appreciated that clustering algorithms are generally based on distances between sample points alone and involve iteratively breaking down clusters/classes into smaller clusters until each cluster is homogenous. However, such techniques often increase the complexity and implementation cost of the resulting model (e.g., due to additional data storage and/or computational requirements). In the illustrative embodiment, the model generation and selection module 216 utilizes a cost function that penalizes an increased number of clusters such that a balance is made between the overall weighted accuracy of the classification and model complexity.

The hardware translation module 206 is configured to map the machine learning algorithm model generated/determined by the model determination module 204 into hardware code (e.g., binary code, assembly code, or another suitable hardware code) for execution by the target platform. As described herein, in the illustrative embodiment, various cost and/or implementation budgets may be used by the computing device 100 to ensure that suitable code for the model may be embedded on and/or otherwise executed by the target platform. Accordingly, in some embodiments, mapping the machine learning algorithm model may involve a simple translation of the model to the hardware code.

The hardware classification module 208 is configured to execute the algorithm defined by the model or, more specifically, the translated hardware code to perform hardware-based classification of sensed data and/or other user inputs (e.g., if the computing device 100 is the target platform). Of course, in embodiments in which the target platform employs a different architecture than the computing device 100, the hardware code may be embedded on and/or executed by that computing device.

The communication module 210 handles the communication between the computing device 100 and other computing devices over a network. For example, in some embodiments, the communication module 210 may transmit the generated hardware code and/or machine learning algorithm model to the target computing device.

Figure 3:
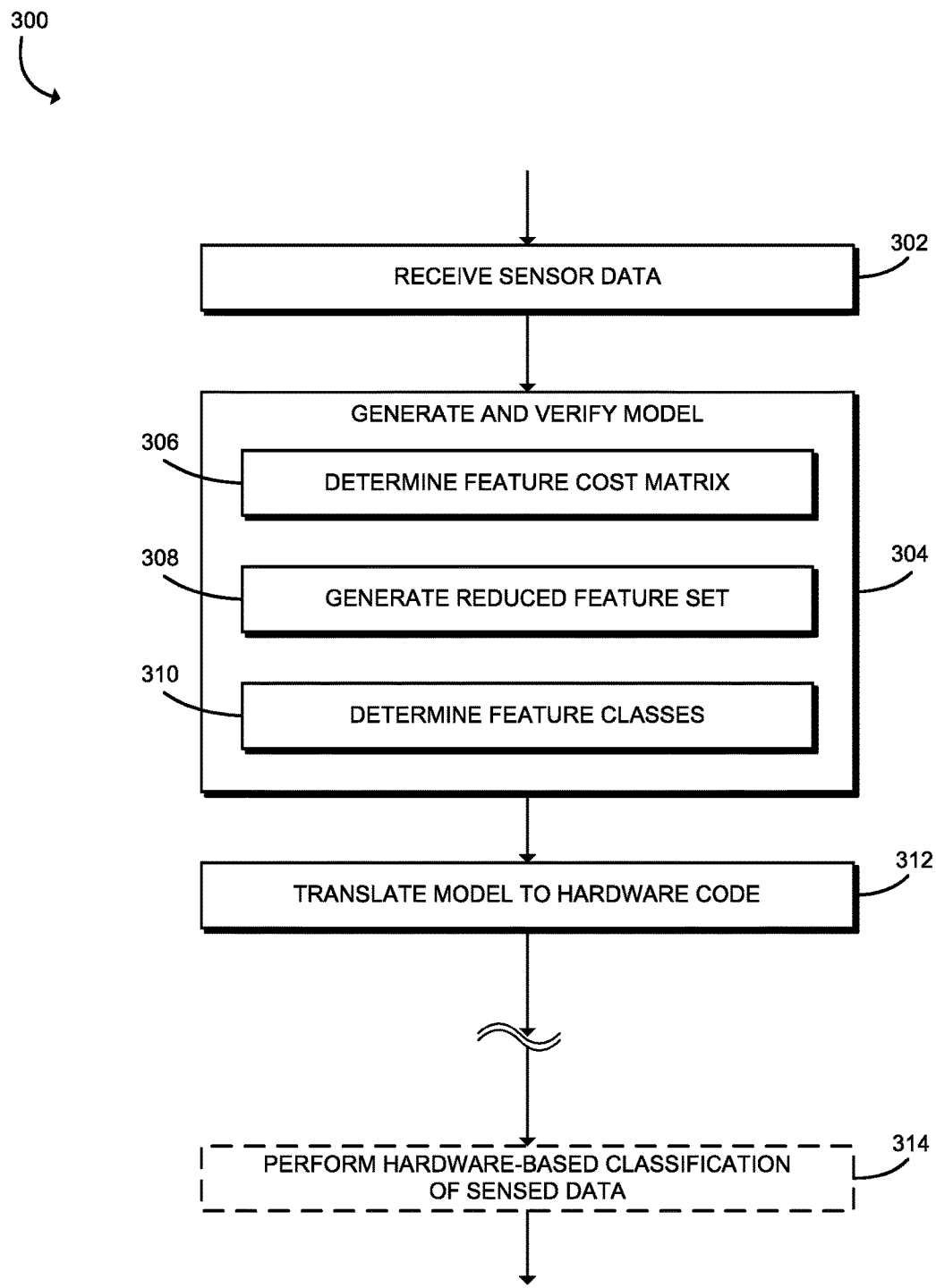
FIG. 3 is a simplified flow diagram of at least one embodiment of a method for platform-targeted machine learning that may be executed by the computing device of FIG. 1.

Referring now to FIG. 3, in use, the computing device 100 may execute a method 300 for platform-targeted machine learning. The illustrative method 300 begins with block 302 in which the computing device 100 receives sensor data and/or other input data from the sensors 120 of the computing device 100. It should be appreciated that, in some embodiments, the input data may include training data that includes individual data points with known classifications.

Figure 4:
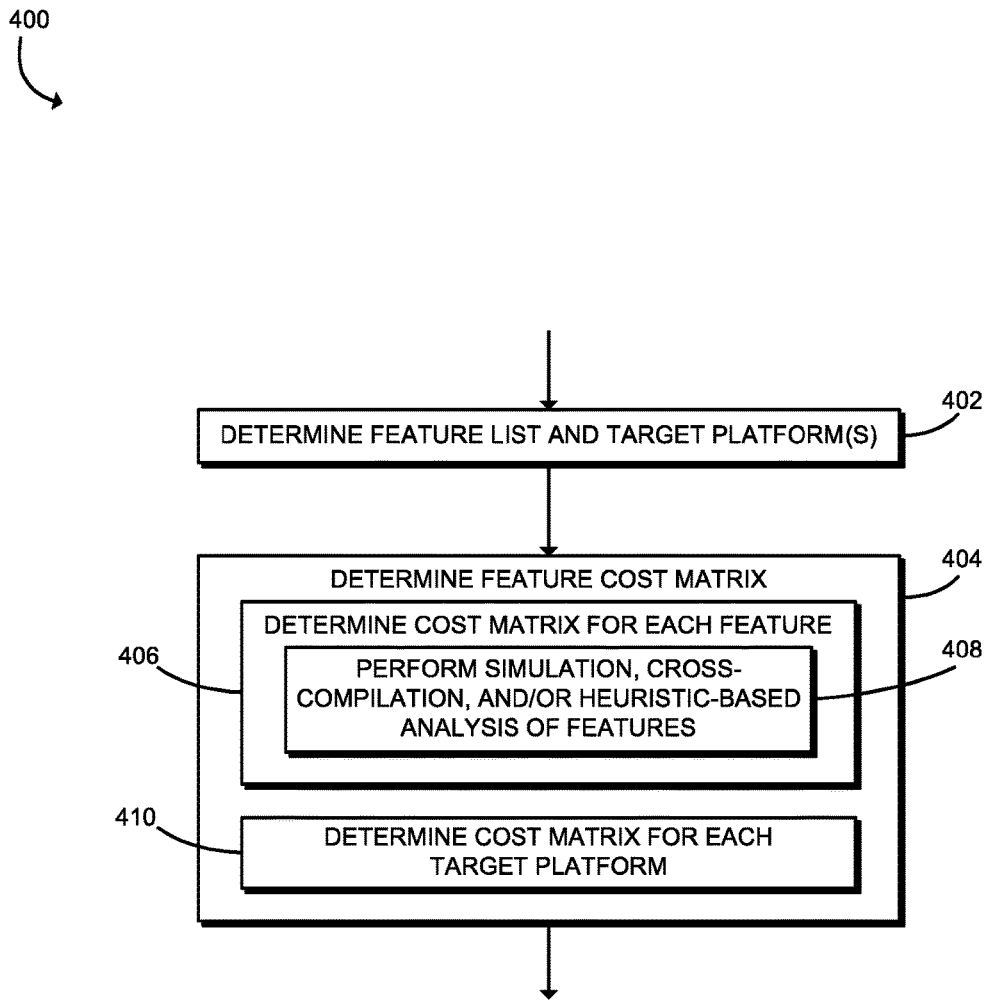
FIG. 4 is a simplified flow diagram of at least one embodiment of a method for determining a feature cost matrix that may be executed by the computing device of FIG. 1.
Figure 5:
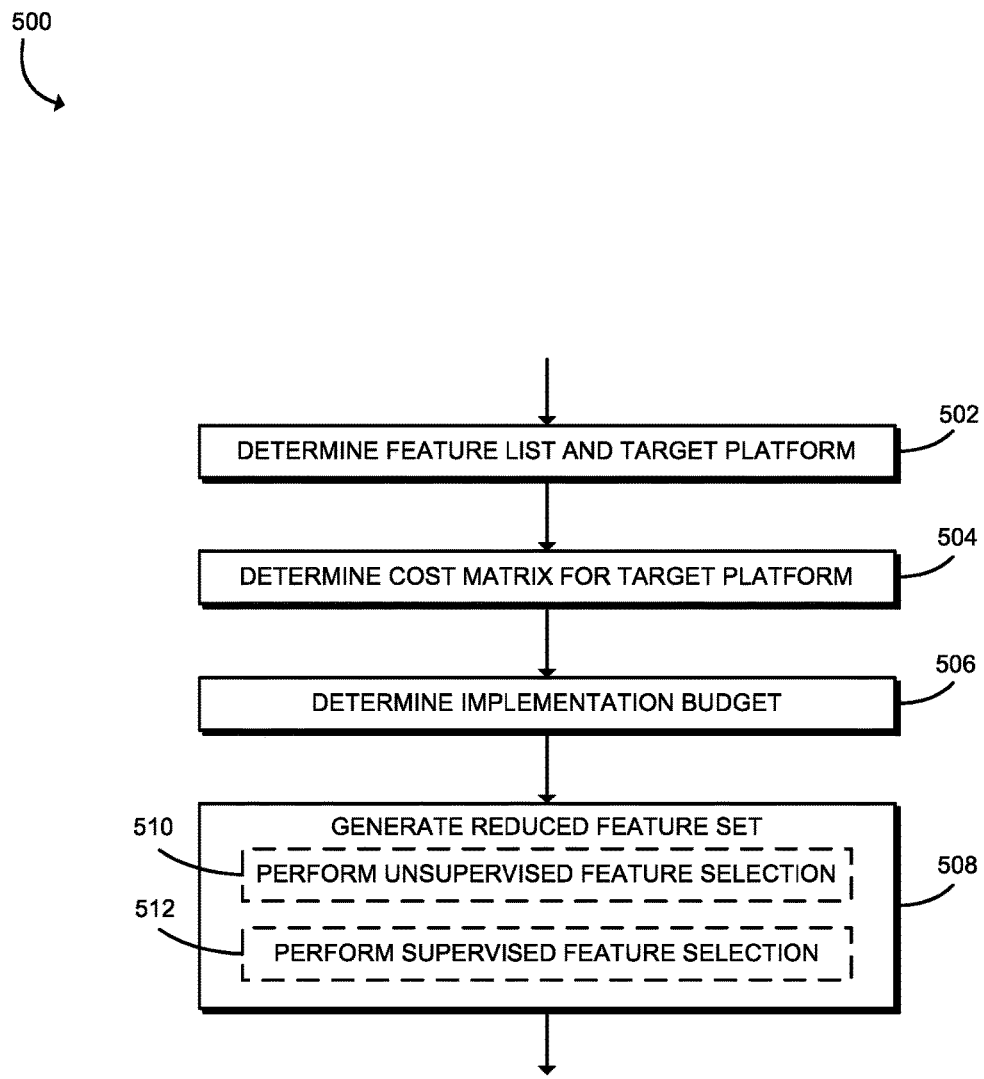
FIG. 5 is a simplified flow diagram of at least one embodiment of a method for generating a reduced feature set that may be executed by the computing device of FIG. 1.
Figure 8:
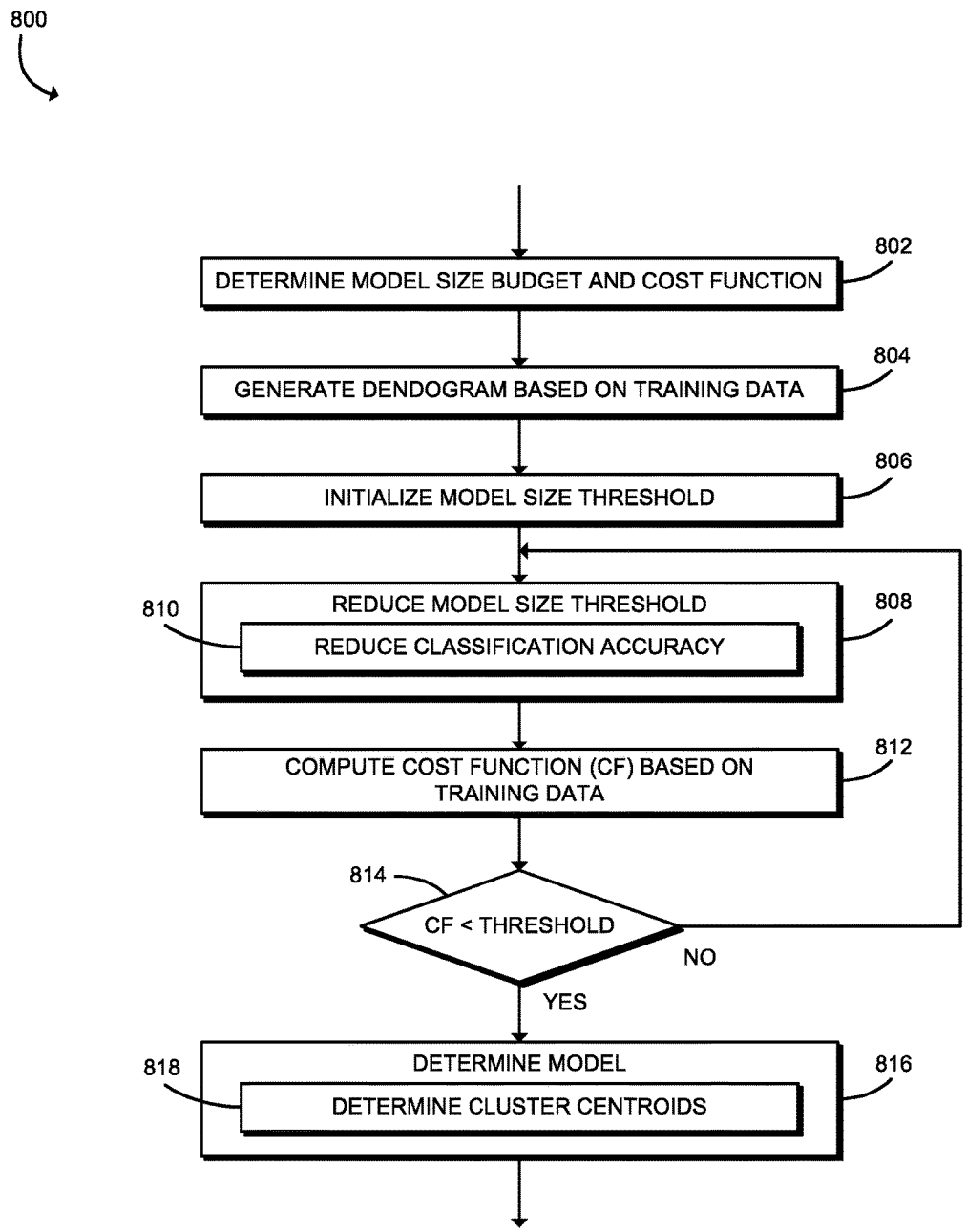
FIG. 8 is a simplified flow diagram of at least one embodiment of a method for generating and selecting a model that may be executed by the computing device of FIG. 1.

In block 304, the computing device 100 generates the machine learning algorithm model. As indicated above, in the illustrative embodiment, the computing device 100 generates a model that balances accuracy of classification with the implementation cost associated with execution on a target platform and, in doing so, may consider an implementation budget that identifies permitted resource utilization by the features of the model. In particular, in block 306, the computing device 100 may determine a feature cost matrix or set of feature metrics as shown in FIG. 4 and described below. In other words, the computing device 100 may compute a cost metric for each candidate feature based on the target platform(s). In block 308, the computing device 100 may eliminate one or more features (e.g., redundant features) from the candidate feature set to generate a reduced feature set. To do so, the computing device 100 may execute a method 500 as shown in FIG. 5 and described below. Further, in block 310, the computing device 100 may determine the particular classes/clusters to be used for classification and, in doing so, balance the accuracy of the classification and the implementation cost of the model (e.g., the number of classes). To do so, the computing device 100 may execute a method 800 as shown in FIG. 8 and described below.

In block 312, the computing device 100 is configured to translate the determined/generated machine learning algorithm model into hardware code (e.g., binary code, assembly code, or another suitable hardware code) for execution by the target platform. In some embodiments, in block 314, the computing device 100 may perform hardware-based classification of the sensed data, other sensed data, and/or other suitable user inputs (e.g., if the computing device 100 is the target platform or has a similar architecture). In other embodiments, the computing device 100 may transmit the hardware code, the model, cost metrics/matrices, and/or other data to the target platform for execution.

Referring now to FIG. 4, in use, the computing device 100 may execute a method 400 for determining a feature cost matrix or set of feature metrics (e.g., in block 306 of the method 300). The illustrative method 400 begins with block 402 in which the computing device 100 determines a feature list that identifies a set of candidate features and one or more target platforms for which to compute cost data. As described above, each of the features may be embodied as any function or algorithm capable of being applied to input data to distinguish the input data from other data (e.g., other input data). For example, the features may include calculation of the average of user inputs (e.g., sensor data), identifying a minimum or maximum of a data set, application of a Fast Fourier Transform (FFT) to a set of input data, and/or another suitable function or algorithm capable of being applied to the input data. The features may be predefined or user-defined depending on the particular embodiment.

In block 404, the computing device 100 may determine a feature cost matrix or set of metrics. It should be appreciated that the cost metrics may include data indicative of various resource requirements of a particular feature. For example, a cost matrix may include cost metric(s) that indicate a particular feature costs twenty seconds to calculate, requires two kilobytes of a buffer, requires three hundred bytes of memory to store the code, includes ten thousand instructions, and/or has other cost-related constraints. In block 406, the computing device 100 may determine a cost matrix or cost metrics for each candidate feature identified in the feature list. For example, in some embodiments, the features may be selected from a predefined library of functions (e.g., digital signal processor (DSP) functions) that identifies an estimated cost to extract the feature for a particular system architecture (e.g., the target platform). In other embodiments, the features may be user-defined such that the cost is not predefined. In such embodiments, the corresponding functions may be compiled (e.g., for a particular DSP) to estimate the cost of the feature. In block 408, the computing device 100 may perform simulation, cross-compilation, and/or heuristic-based analysis of the features to determine the cost metrics and/or cost matrix. Further, in block 410, the computing device 100 may determine a cost matrix or set of cost metrics for each target platform. In other words, in some embodiments, the cost matrix may include data indicative of a cost of each of the candidate features for a particular target platform. Although the cost metrics are described herein as cost matrices, it should be appreciated that a set of cost metrics of the various features may be represented in any suitable format or data structure. Further, in some embodiments, the computing device 100 may determine a cost matrix and/or set of cost metrics for a single target platform.

Referring now to FIG. 5, in use, the computing device 100 may execute a method 500 for generating a reduced feature set. The illustrative method 500 begins with block 502 in which the computing device 100 identifies, retrieves, or otherwise determines the candidate feature list and target platform. As discussed above, in the illustrative embodiment, the computing device 100 utilizes separate cost matrices and/or cost metrics for each potential target platform. As such, in block 504, the computing device 102 determines/retrieves the cost matrix and/or cost metrics for the target platform and, in block 506, the computing device 100 determines the implementation budget of the target platform. For example, the implementation budget may identify a maximum overall cost to extract the selected features. As discussed above, the implementation budget may indicate, for example, a maximum/available utilization of one or more hardware resources, a maximum number of features included, and/or other suitable constraints associated with the particular target platform. In some embodiments, the implementation budget may identify a maximum permissible time to compute the feature (e.g., in clock cycles), a maximum buffer size used during application of the feature, a maximum code size associated with the feature extraction, a maximum number of instructions associated with application of the feature, permissible data formats, and/or other suitable cost constraints.

In block 508, the computing device 100 generates a reduced feature set based on the candidate feature set/list, the cost metrics to implement each of the candidate features on the particular target platform, and the implementation budget for the target platform. In particular, the computing device 100 may eliminate redundant features in response to identifying highly correlated features. To do so, the computing device 100 may employ one or more feature selection algorithms that take into account the cost-related data. For example, in block 510, the computing device 100 may perform unsupervised feature selection as shown in FIG. 6.

Figure 7:
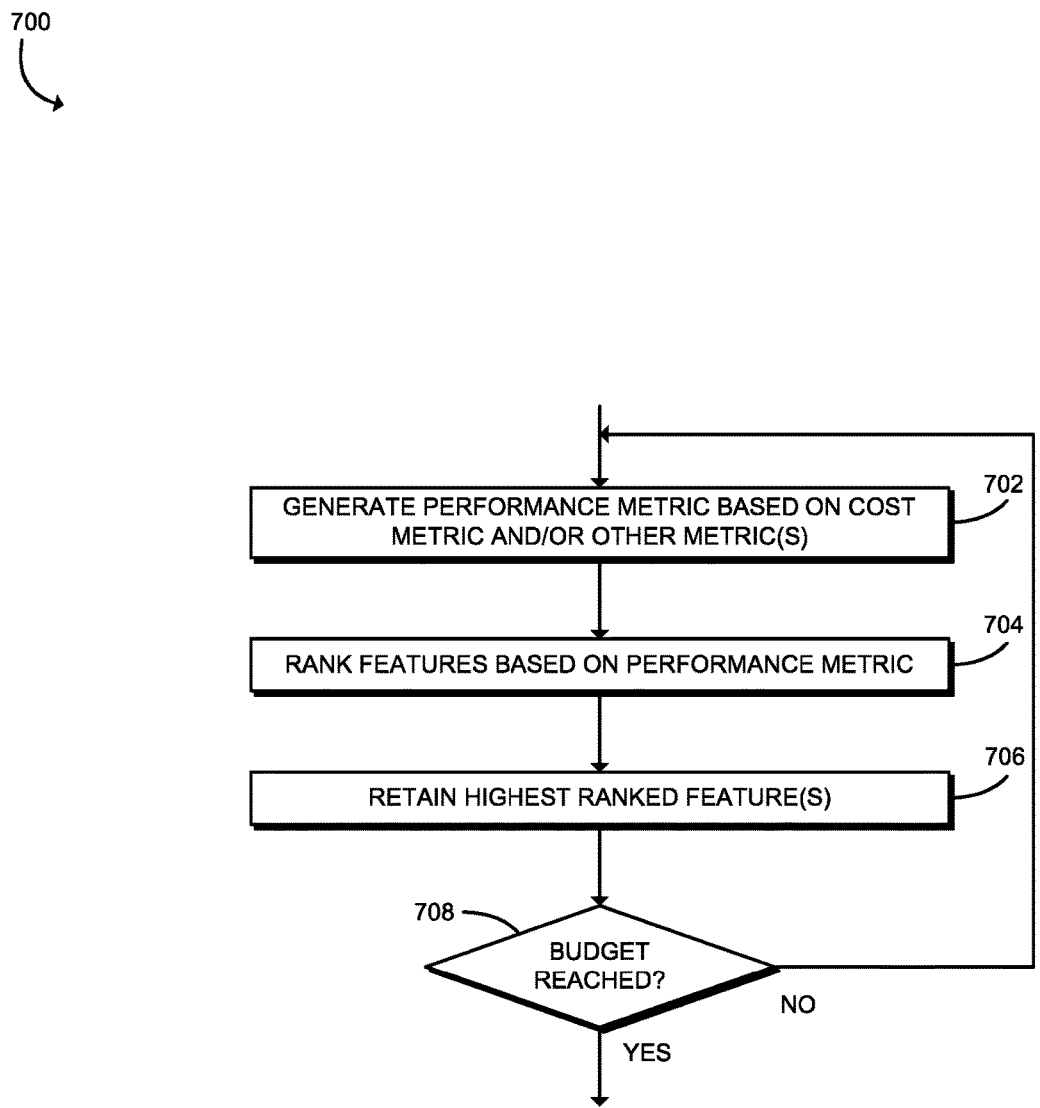
FIG. 7 is a simplified flow diagram of at least one embodiment of a method for performing supervised feature selection that may be executed by the computing device of FIG. 1.

Additionally or alternatively, in block 512, the computing device 100 may perform supervised feature selection as shown in FIG. 7.

Figure 6:
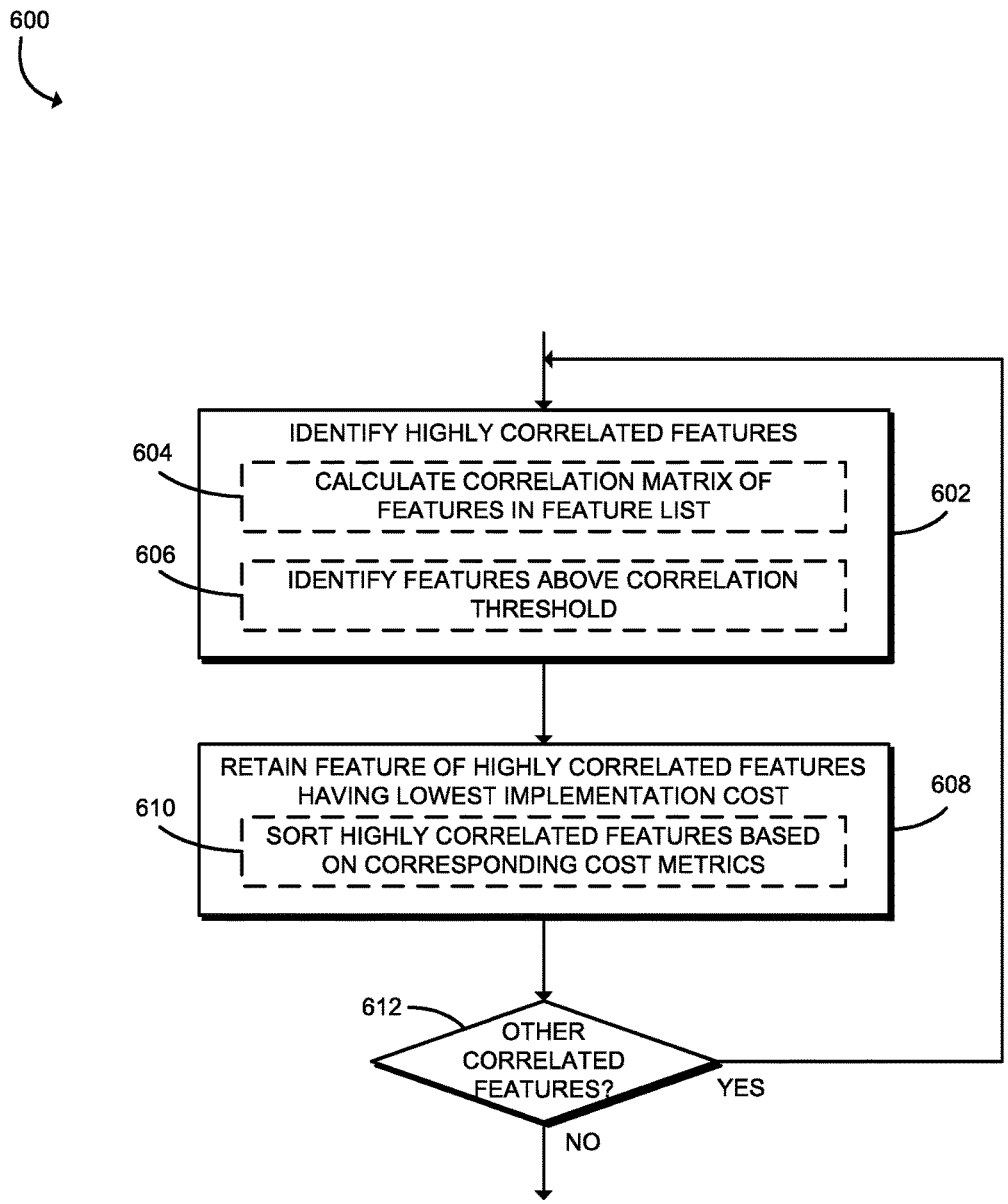
FIG. 6 is a simplified flow diagram of at least one embodiment of a method for performing unsupervised feature selection that may be executed by the computing device of FIG. 1.

Referring now to FIG. 6, in use, the computing device 100 may execute a method 600 for performing unsupervised feature selection. It should be appreciated that the computing device 100 may utilize any suitable unsupervised feature selection algorithm consistent with the functions described herein. For example, in some embodiments, the computing device 100 may utilize variance thresholding or correlation thresholding. The illustrative method 600 begins with block 602 in which the computing device 100 identifies a set of highly correlated features from the candidate feature set. It should be appreciated that the computing device 100 may utilize any suitable technique, mechanism, and/or algorithm for determining the extent to which two features are correlated with one another. For example, in block 604, the computing device 100 may calculate the correlation matrix of the candidate features. Further, in block 606, the computing device 100 may identify features that have values in the correlation matrix above a predefined threshold as highly correlated features. In block 608, the computing device 100 retains the feature(s) having the lowest implementation cost on the target platform and eliminates the redundant feature(s) from the candidate feature set. More specifically, in block 610, the computing device 100 may sort/rank the highly correlated features based on the corresponding cost metrics of those features and identify the feature having the lowest implementation cost. It should be appreciated that the computing device 100 may prioritize various resources/metrics in determining which feature has the lowest implementation cost based on the particular implementation. For example, in one embodiment, the computing device 100 may sort the highly correlated features based on the number of clock cycles required to extract the feature and, in another embodiment, the computing device 100 may sort the highly correlated features based on a buffer size required to extract the feature. In yet another embodiment, the computing device 100 may utilize, for example, a weighted average or other combinational analytic of multiple metrics in determining which of the highly correlated features is least costly.

In block 612, the computing device 100 determines whether to identify other highly correlated features. That is, in some embodiments, the candidate feature set may include multiple sets of features that are highly correlated with one another. For example, in one embodiment, features 1-2 may be highly correlated, features 3-4 may be highly correlated, features 5-7 may be highly correlated, and features 6-10 may not be highly correlated with any other feature. In such embodiments, the computing device 100 may execute the method 600 for each of the sets of highly correlated features (i.e., the set of features 1-2, the set of features 3-4, and the set of features 5-7). Accordingly, if the computing device 100 determines to identify whether there are other highly correlated features in block 612, the method 600 returns to block 602.

Referring now to FIG. 7, in use, the computing device 100 may execute a method 700 for performing supervised feature selection. It should be appreciated that the computing device 100 may utilize any suitable supervised feature selection algorithm consistent with the functions described herein. For example, in some embodiments, the computing device 100 may utilize recursive feature elimination, tree-based feature selection, and/or univariate feature selection. The illustrative method 700 begins with block 702 in which the computing device 100 generates a performance metric based on the cost metric and/or other metrics of the candidate features. In block 704, the computing device 100 ranks the features based on the performance metric and, in block 706, the computing device 100 retains the highest ranked feature(s) in the candidate list. It should be appreciated that, depending on the particular embodiment, the number of features retained by the computing device 100 may vary. For example, the threshold number of features to be retained may be based on the computational power or architecture of the computing device 100, selectable by a user, and/or based on some other criteria. In block 708, the computing device 100 determines whether a budget for feature extraction has been reached. If not, the method 700 returns to block 702 in which the computing device 100 generates the performance metric based on the cost metric. In other words, the computing device 100 may recursively eliminate highly correlated features from the candidate feature list.

Referring now to FIG. 8, in use, the computing device 100 may execute a method 800 for generating and selecting a model, for example, that meets predefined cost and quality criteria. The illustrative method 800 begins with block 802 in which the computing device 100 determines a model size budget and cost function (e.g., a user-defined cost function). In the illustrative embodiment, the model size budget includes data is indicative of a maximum number/amount of one or more resources permissible for execution on the target platform. The cost function may assign different weights to various classification errors (e.g., false positives and false negatives) such that the computing device 100 may more appropriately handle such classification errors depending on the particular embodiment. In the illustrative embodiment, the cost function further incorporates model complexity metrics such that the cost function involves a trade-off between loss of accuracy in the classification (e.g., measured as a weighted cost of "foreign samples" in a cluster) and model complexity (e.g. measured as the number of cluster centroids).

In block 804, the computing device 100 may generate a dendogram or other suitable model-defining structure from training data received by the computing device 100 and, in block 806, the computing device 100 initializes the model size threshold. For example, in some embodiments, the model size threshold may be initialized to a maximum value. The computing device 100 may reduce the model size threshold in block 808 and, in doing so, may reduce the classification accuracy in block 810. In block 812, the computing device 100 may compute the cost function based on the training data and compare the cost function value to the model size threshold. If the computing device 100 determines, in block 814, that the model size threshold exceeds the cost function value, the computing device 100 determines the resources and/or model in block 816. In doing so, in block 818, the computing device 100 may determine, for example, the centroids of the resulting clusters associated with the classes. Otherwise, the method 800 returns to block 808 in which the computing device 100 reduces the model size threshold.

For example, in an embodiment, the computing device 100 may be analyzing ten training data points (i.e., samples) with eight of those data points belonging to a first class and the other two being foreign (e.g., belonging to a second class). Initially, the data points may be collectively assigned to the first class and the computing device 100 determines how to address the two foreign points. For example, the computing device 100 could assign the two points to the first class, which would be associated with a particular cost (e.g., from false positives or false negatives after computing the resulting centroid) based on the cost function. As such, the cost function may be utilized in determining whether to break the cluster into multiple clusters (e.g., to accommodate the foreign samples) or associate the foreign samples with the first cluster. Of course, it should be appreciated that the parameters of the cost function may affect such a determination.

It should be appreciated that, in some embodiments, any one or more of the methods 300, 400, 500, 600, 700, and/or 800 may be embodied as various instructions stored on a computer-readable media, which may be executed by the processor 110 and/or other components of the computing device 100 to cause the computing device 100 to perform the respective method 300, 400, 500, 600, 700, and/or 800. The computer-readable media may be embodied as any type of media capable of being read by the computing device 100 including, but not limited to, the memory 114, the data storage 116, other memory or data storage devices of the computing device 100, portable media readable by a peripheral device 122 of the computing device 100, and/or other media.

EXAMPLES

Illustrative examples of the technologies disclosed herein are provided below. An embodiment of the technologies may include any one or more, and any combination of, the examples described below.

Example 1 includes a computing device for platform-targeted machine learning, the computing device comprising a model determination module to generate a machine learning algorithm model indicative of a plurality of classes between which a user input is to be classified, wherein the user input is to be classified as being associated with a particular class based on an application of one or more features to the user input, and wherein each of the one or more features has an associated implementation cost indicative of a cost to perform on a target platform on which the corresponding feature is to be applied to the user input; and a hardware translation module to translate the machine learning algorithm model into hardware code for execution on the target platform.

Example 2 includes the subject matter of Example 1, and wherein the user input comprises sensor data generated by one or more sensors of the computing device.

Example 3 includes the subject matter of any of Examples 1 and 2, and wherein to generate the machine learning algorithm model comprises to determine a set of cost metrics of a plurality of features, wherein each cost metric of the set of cost metrics is indicative of an implementation cost of a corresponding feature of the plurality of features on the target platform.

Example 4 includes the subject matter of any of Examples 1-3, and wherein to determine the set of cost metrics comprises to determine a feature cost matrix based on a list of features that includes the plurality of features and one or more target platforms.

Example 5 includes the subject matter of any of Examples 1-4, and wherein to determine each cost metric comprises to perform at least one of simulation, cross-compilation, or heuristic-based analysis of the corresponding feature.

Example 6 includes the subject matter of any of Examples 1-5, and wherein at least one feature of the plurality of features is a user-defined feature.

Example 7 includes the subject matter of any of Examples 1-6, and wherein each feature of the plurality of features is a function of the user input.

Example 8 includes the subject matter of any of Examples 1-7, and wherein to generate the machine learning algorithm model comprises to determine a reduced feature set from a plurality of features; and wherein the model is based on features of the reduced feature set.

Example 9 includes the subject matter of any of Examples 1-8, and wherein to determine the reduced feature set comprises to determine a corresponding cost metric for each feature of the reduced feature set, wherein each cost metric is indicative of an implementation cost of the corresponding feature on the target platform; determine an implementation budget indicative of a maximum usage of a hardware resource; and generate the reduce feature set based on the cost metrics and the implementation budget.

Example 10 includes the subject matter of any of Examples 1-9, and wherein to determine the reduced feature set comprises to perform unsupervised feature selection based on the plurality of features.

Example 11 includes the subject matter of any of Examples 1-10, and wherein to perform the unsupervised feature selection comprises to identify a set of highly correlated features of the plurality of features; and retain a feature of the set of highly correlated features having a lowest implementation cost.

Example 12 includes the subject matter of any of Examples 1-11, and wherein to identify the set of highly correlated features comprises to calculate a correlation matrix based on the plurality of features; and identify a set of features above a predefined correlation threshold.

Example 13 includes the subject matter of any of Examples 1-12, and wherein to retain the feature comprises to sort the set of highly correlated features based on corresponding cost metrics of the highly correlated features.

Example 14 includes the subject matter of any of Examples 1-13, and wherein to perform the unsupervised feature selection comprises to perform at least one of variance thresholding or correlation thresholding.

Example 15 includes the subject matter of any of Examples 1-14, and wherein to determine the reduced feature set comprises to perform supervised feature selection based on the plurality of features.

Example 16 includes the subject matter of any of Examples 1-15, and wherein to perform the supervised feature selection comprises to generate a performance metric based on corresponding cost metrics of the plurality of features; rank the plurality of features based on the performance metric; and retain a highest ranked feature of the ranked plurality of features.

Example 17 includes the subject matter of any of Examples 1-16, and wherein to generate the machine learning algorithm model comprises to determine the model based on a cost function that incorporates predefined hardware execution costs to perform a corresponding classification.

Example 18 includes the subject matter of any of Examples 1-17, and wherein to determine the model comprises to compute the cost function based on training data; and iteratively reduce an accuracy of classification of one or more classes until a threshold is reached.

Example 19 includes the subject matter of any of Examples 1-18, and wherein to translate the machine learning algorithm model into the hardware code comprises to automatically translate the machine learning algorithm model into the hardware code.

Example 20 includes the subject matter of any of Examples 1-19, and further including a hardware classification module to execute the hardware code to perform hardware-based classification of sensed data.

Example 21 includes a method for platform-targeted machine learning, the method comprising generating, by a computing device, a machine learning algorithm model indicative of a plurality of classes between which a user input is to be classified, wherein the user input is to be classified as being associated with a particular class based on an application of one or more features to the user input, and wherein each of the one or more features has an associated implementation cost indicative of a cost to perform on a target platform on which the corresponding feature is to be applied to the user input; and translating, by the computing device, the machine learning algorithm model into hardware code for execution on the target platform.

Example 22 includes the subject matter of Example 21, and wherein the user input comprises sensor data generated by one or more sensors of the computing device.

Example 23 includes the subject matter of any of Examples 21 and 22, and wherein generating the machine learning algorithm model comprises determining a set of cost metrics of a plurality of features, wherein each cost metric of the set of cost metrics is indicative of an implementation cost of a corresponding feature of the plurality of features on the target platform.

Example 24 includes the subject matter of any of Examples 21-23, and wherein determining the set of cost metrics comprises determining a feature cost matrix based on a list of features including the plurality of features and one or more target platforms.

Example 25 includes the subject matter of any of Examples 21-24, and wherein determining each cost metric comprises performing at least one of simulation, cross-compilation, or heuristic-based analysis of the corresponding feature.

Example 26 includes the subject matter of any of Examples 21-25, and wherein at least one feature of the plurality of features is a user-defined feature.

Example 27 includes the subject matter of any of Examples 21-26, and wherein each feature of the plurality of features is a function of the user input.

Example 28 includes the subject matter of any of Examples 21-27, and wherein generating the machine learning algorithm model comprises determining a reduced feature set from a plurality of features; and wherein the model is based on features of the reduced feature set.

Example 29 includes the subject matter of any of Examples 21-28, and wherein determining the reduced feature set comprises determining a corresponding cost metric for each feature of the reduced feature set, wherein each cost metric is indicative of an implementation cost of the corresponding feature on the target platform; determining an implementation budget indicative of a maximum usage of a hardware resource; and generating the reduce feature set based on the cost metrics and the implementation budget.

Example 30 includes the subject matter of any of Examples 21-29, and wherein determining the reduced feature set comprises performing unsupervised feature selection based on the plurality of features.

Example 31 includes the subject matter of any of Examples 21-30, and wherein performing the unsupervised feature selection comprises identifying a set of highly correlated features of the plurality of features; and retaining a feature of the set of highly correlated features having a lowest implementation cost.

Example 32 includes the subject matter of any of Examples 21-31, and wherein identifying the set of highly correlated features comprises calculating a correlation matrix based on the plurality of features; and identifying a set of features above a predefined correlation threshold.

Example 33 includes the subject matter of any of Examples 21-32, and wherein retaining the feature comprises sorting the set of highly correlated features based on corresponding cost metrics of the highly correlated features.

Example 34 includes the subject matter of any of Examples 21-33, and wherein performing the unsupervised feature selection comprises performing at least one of variance thresholding or correlation thresholding.

Example 35 includes the subject matter of any of Examples 21-34, and wherein determining the reduced feature set comprises performing supervised feature selection based on the plurality of features.

Example 36 includes the subject matter of any of Examples 21-35, and wherein performing the supervised feature selection comprises generating a performance metric based on corresponding cost metrics of the plurality of features; ranking the plurality of features based on the performance metric; and retaining a highest ranked feature of the ranked plurality of features.

Example 37 includes the subject matter of any of Examples 21-36, and wherein generating the machine learning algorithm model comprises determining the model based on a cost function that incorporates predefined hardware execution costs to perform a corresponding classification.

Example 38 includes the subject matter of any of Examples 21-37, and wherein determining the model comprises computing the cost function based on training data; and iteratively reducing an accuracy of classification of one or more classes until a threshold is reached.

Example 39 includes the subject matter of any of Examples 21-38, and wherein translating the machine learning algorithm model into the hardware code comprises automatically translating the machine learning algorithm model into the hardware code.

Example 40 includes the subject matter of any of Examples 21-39, and further including executing the hardware code to perform hardware-based classification of sensed data.

Example 41 includes a computing device comprising a processor; and a memory having stored therein a plurality of instructions that when executed by the processor cause the computing device to perform the method of any of Examples 21-40.

Example 42 includes one or more machine-readable storage media comprising a plurality of instructions stored thereon that in response to being executed result in a computing device performing the method of any of Examples 21-40.

Example 43 includes a computing device comprising means for performing the method of any of Examples 21-40.

Example 44 includes a computing device for platform-targeted machine learning, the computing device comprising means for generating a machine learning algorithm model indicative of a plurality of classes between which a user input is to be classified, wherein the user input is to be classified as being associated with a particular class based on an application of one or more features to the user input, and wherein each of the one or more features has an associated implementation cost indicative of a cost to perform on a target platform on which the corresponding feature is to be applied to the user input; and means for translating the machine learning algorithm model into hardware code for execution on the target platform.

Example 45 includes the subject matter of Example 44, and wherein the user input comprises sensor data generated by one or more sensors of the computing device.

Example 46 includes the subject matter of any of Examples 44 and 45, and wherein the means for generating the machine learning algorithm model comprises means for determining a set of cost metrics of a plurality of features, wherein each cost metric of the set of cost metrics is indicative of an implementation cost of a corresponding feature of the plurality of features on the target platform.

Example 47 includes the subject matter of any of Examples 44-46, and wherein the means for determining the set of cost metrics comprises means for determining a feature cost matrix based on a list of features including the plurality of features and one or more target platforms.

Example 48 includes the subject matter of any of Examples 44-47, and wherein the means for determining each cost metric comprises means for performing at least one of simulation, cross-compilation, or heuristic-based analysis of the corresponding feature.

Example 49 includes the subject matter of any of Examples 44-48, and wherein at least one feature of the plurality of features is a user-defined feature.

Example 50 includes the subject matter of any of Examples 44-49, and wherein each feature of the plurality of features is a function of the user input.

Example 51 includes the subject matter of any of Examples 44-50, and wherein the means for generating the machine learning algorithm model comprises means for determining a reduced feature set from a plurality of features; and wherein the model is based on features of the reduced feature set.

Example 52 includes the subject matter of any of Examples 44-51, and wherein the means for determining the reduced feature set comprises means for determining a corresponding cost metric for each feature of the reduced feature set, wherein each cost metric is indicative of an implementation cost of the corresponding feature on the target platform; means for determining an implementation budget indicative of a maximum usage of a hardware resource; and means for generating the reduce feature set based on the cost metrics and the implementation budget.

Example 53 includes the subject matter of any of Examples 44-52, and wherein the means for determining the reduced feature set comprises means for performing unsupervised feature selection based on the plurality of features.

Example 54 includes the subject matter of any of Examples 44-53, and wherein the means for performing the unsupervised feature selection comprises means for identifying a set of highly correlated features of the plurality of features; and means for retaining a feature of the set of highly correlated features having a lowest implementation cost.

Example 55 includes the subject matter of any of Examples 44-54, and wherein the means for identifying the set of highly correlated features comprises means for calculating a correlation matrix based on the plurality of features; and means for identifying a set of features above a predefined correlation threshold.

Example 56 includes the subject matter of any of Examples 44-55, and wherein the means for retaining the feature comprises means for sorting the set of highly correlated features based on corresponding cost metrics of the highly correlated features.

Example 57 includes the subject matter of any of Examples 44-56, and wherein the means for performing the unsupervised feature selection comprises means for performing at least one of variance thresholding or correlation thresholding.

Example 58 includes the subject matter of any of Examples 44-57, and wherein the means for determining the reduced feature set comprises means for performing supervised feature selection based on the plurality of features.

Example 59 includes the subject matter of any of Examples 44-58, and wherein the means for performing the supervised feature selection comprises means for generating a performance metric based on corresponding cost metrics of the plurality of features; means for ranking the plurality of features based on the performance metric; and means for retaining a highest ranked feature of the ranked plurality of features.

Example 60 includes the subject matter of any of Examples 44-59, and wherein the means for generating the machine learning algorithm model comprises means for determining the model based on a cost function that incorporates predefined hardware execution costs to perform a corresponding classification.

Example 61 includes the subject matter of any of Examples 44-60, and wherein the means for determining the model comprises means for computing the cost function based on training data; and means for iteratively reducing an accuracy of classification of one or more classes until a threshold is reached.

Example 62 includes the subject matter of any of Examples 44-61, and wherein the means for translating the machine learning algorithm model into the hardware code comprises means for automatically translating the machine learning algorithm model into the hardware code.

Example 63 includes the subject matter of any of Examples 44-62, and further including means for executing the hardware code to perform hardware-based classification of sensed data.

The invention claimed is:

1. A computing device for platform-targeted machine learning, the computing device comprising:
   one or more processors; and
   a memory storing instructions, which, when executed on the one or more processors, causes the computing device to:
   generate a machine learning algorithm model indicative of a plurality of classes between which a user input is to be classified, wherein the user input is to be classified as being associated with a particular class based on an application of one or more features to the user input, and wherein each of the one or more features has an associated implementation cost indicative of a cost to perform on a target platform on which the corresponding feature is to be applied to the user input, wherein the model is based on a reduced feature set of the one or more features determined by a calculation of a correlation matrix of the one or more features and an identification of a set features of the one or more features exceeding a predefined correlation threshold; and
   translate the machine learning algorithm model into hardware code for execution on the target platform.

2. The computing device of claim 1, wherein the user input comprises sensor data generated by one or more sensors of the computing device.

3. The computing device of claim 1, wherein to generate the machine learning algorithm model comprises to determine the reduced feature set from a plurality of features.

4. The computing device of claim 3, wherein to determine the reduced feature set comprises to:
determine a corresponding cost metric for each feature of the reduced feature set, wherein each cost metric is indicative of an implementation cost of the corresponding feature on the target platform;
determine an implementation budget indicative of a maximum usage of a hardware resource; and
generate the reduced feature set based on the cost metrics and the implementation budget.

5. The computing device of claim 3, wherein to determine the reduced feature set comprises to perform unsupervised feature selection based on the plurality of features.

6. The computing device of claim 5, wherein to perform the unsupervised feature selection comprises to:
identify a set of highly correlated features of the plurality of features; and
retain a feature of the set of highly correlated features having a lowest implementation cost.

7. The computing device of claim 6, wherein to identify the set of highly correlated features comprises to:
calculate the correlation matrix based on the plurality of features; and
identify a set of features above the predefined correlation threshold.

8. The computing device of claim 6, wherein to retain the feature comprises to sort the set of highly correlated features based on corresponding cost metrics of the highly correlated features.

9. The computing device of claim 5, wherein to perform the unsupervised feature selection comprises to perform at least one of variance thresholding or correlation thresholding.

10. The computing device of claim 3, wherein to determine the reduced feature set comprises to perform supervised feature selection based on the plurality of features.

11. The computing device of claim 10, wherein to perform the supervised feature selection comprises to:
generate a performance metric based on corresponding cost metrics of the plurality of features;
rank the plurality of features based on the performance metric; and
retain a highest ranked feature of the ranked plurality of features.

12. One or more non-transitory machine-readable storage media comprising a plurality of instructions stored thereon that, in response to execution by a computing device, cause the computing device to:
generate a machine learning algorithm model indicative of a plurality of classes between which a user input is to be classified, wherein the user input is to be classified as being associated with a particular class based on an application of one or more features to the user input, and wherein each of the one or more features has an associated implementation cost indicative of a cost to perform on a target platform on which the corresponding feature is to be applied to the user input, wherein the model is based on a reduced feature set of the one or more features determined by a calculation of a correlation matrix of the one or more features and an identification of a set features of the one or more features exceeding a predefined correlation threshold; and
translate the machine learning algorithm model into hardware code for execution on the target platform.

13. The one or more non-transitory machine-readable storage media of claim 12, wherein to generate the machine learning algorithm model comprises to determine a set of cost metrics of a plurality of features, wherein each cost metric of the set of cost metrics is indicative of an implementation cost of a corresponding feature of the plurality of features on the target platform.

14. The one or more non-transitory machine-readable storage media of claim 13, wherein to determine the set of cost metrics comprises to determine a feature cost matrix based on a list of features including the plurality of features and one or more target platforms.

15. The one or more non-transitory machine-readable storage media of claim 13, wherein to determine each cost metric comprises to perform at least one of simulation, cross-compilation, or heuristic-based analysis of the corresponding feature.

16. The one or more non-transitory machine-readable storage media of claim 13, wherein at least one feature of the plurality of features is a user-defined feature.

17. The one or more non-transitory machine-readable storage media of claim 13, wherein each feature of the plurality of features is a function of the user input.

18. The one or more non-transitory machine-readable storage media of claim 12, wherein to generate the machine learning algorithm model comprises to determine the model based on a cost function that incorporates predefined hardware execution costs to perform a corresponding classification.

19. The one or more non-transitory machine-readable storage media of claim 18, wherein to determine the model comprises to:
compute the cost function based on training data; and
iteratively reduce an accuracy of classification of one or more classes until a threshold is reached.

20. The one or more non-transitory machine-readable storage media of claim 12, wherein to translate the machine learning algorithm model into the hardware code comprises to automatically translate the machine learning algorithm model into the hardware code.

21. The one or more non-transitory machine-readable storage media of claim 12, wherein the plurality of instructions further cause the computing device to execute the hardware code to perform hardware-based classification of sensed data.

22. A method for platform-targeted machine learning, the method comprising:
generating, by a computing device, a machine learning algorithm model indicative of a plurality of classes between which a user input is to be classified, wherein the user input is to be classified as being associated with a particular class based on an application of one or more features to the user input, and wherein each of the one or more features has an associated implementation cost indicative of a cost to perform on a target platform on which the corresponding feature is to be applied to the user input, wherein the model is based on a reduced feature set of the one or more features determined by calculating a correlation matrix of the one or more features and identifying a set features of the one or more features exceeding a predefined correlation threshold; and
translating, by the computing device, the machine learning algorithm model into hardware code for execution on the target platform.

23. The method of claim 22, wherein generating the machine learning algorithm model comprises determining a set of cost metrics of a plurality of features, wherein each cost metric of the set of cost metrics is indicative of an implementation cost of a corresponding feature of the plurality of features on the target platform.

24. The method of claim 22, wherein generating the machine learning algorithm model comprises determining the reduced feature set from a plurality of features.

25. The method of claim 22, wherein generating the machine learning algorithm model comprises determining the model based on a cost function that incorporates predefined hardware execution costs to perform a corresponding classification.

* * * * *